US006045186A

United States Patent
Butt et al.

[11] Patent Number: 6,045,186
[45] Date of Patent: Apr. 4, 2000

[54] HIGH TENSION BACK FRAME FOR VEHICLE SEAT ASSEMBLY

[75] Inventors: Timothy R. Butt, Plymouth; Kurt A. Siebold, Dearborn Heights; Joseph P. Vitale, South Lyon; Vasudeva Murthy, Ann Arbor; Christopher E. Woon, Farmington Hills, all of Mich.

[73] Assignee: Johnson Controls Technology Company, Plymouth, Mich.

[21] Appl. No.: 09/206,180

[22] Filed: Dec. 4, 1998

[51] Int. Cl.⁷ .............................. B60N 2/42; B60R 21/00
[52] U.S. Cl. ............... 297/296; 297/216.1; 297/216.13; 297/216.14; 297/216.15; 297/452.18; 297/483
[58] Field of Search ............................... 297/296, 216.13, 297/216.1, 216.15, 216.14, 483, 452.18

[56] References Cited

U.S. PATENT DOCUMENTS

| | | | |
|---|---|---|---|
| 4,003,534 | 1/1977 | Kenigsberg et al. | 297/216.13 X |
| 4,192,545 | 3/1980 | Higuchi et al. | 297/216.13 |
| 4,889,389 | 12/1989 | White | 297/483 X |
| 4,993,778 | 2/1991 | Colin et al. | 297/483 X |
| 5,020,856 | 6/1991 | George | 297/483 |
| 5,328,249 | 7/1994 | Ball | 297/483 |
| 5,390,982 | 2/1995 | Johnson et al. | 297/483 X |
| 5,401,072 | 3/1995 | Farrand | 297/483 X |
| 5,447,360 | 9/1995 | Hewko et al. | 297/216.13 X |
| 5,468,053 | 11/1995 | Thompson et al. | 297/216.13 X |
| 5,658,051 | 8/1997 | Vega et al. | 297/483 |
| 5,697,670 | 12/1997 | Husted et al. | 297/216.13 |
| 5,746,476 | 5/1998 | Novak et al. | 297/483 X |
| 5,823,619 | 10/1998 | Heilig et al. | 297/216.13 X |
| 5,823,627 | 10/1998 | Viano et al. | 297/216.13 X |
| 5,826,936 | 10/1998 | Scordato et al. | 297/216.1 |
| 5,851,055 | 12/1998 | Lewis | 297/216.13 X |
| 5,909,926 | 6/1999 | Gonzalez | 297/452.18 X |

*Primary Examiner*—Peter M. Cuomo
*Assistant Examiner*—Rodney B. White
*Attorney, Agent, or Firm*—Harness, Dickey, & Pierce, P.L.C.

[57] ABSTRACT

A back frame for a vehicle seat assembly having an upright frame member capable of supporting compressive and tensile loading and a secondary, tensile load carrying member capable only of supporting significant loads in tension. The tensile load carrying member is attached to the upright frame member at the upper end of the back frame and extends downward behind the upright frame member and is attached to a base at the lower end of the back frame. The upright frame member is also attached to the base at the lower end of the back frame. The result is a triangular truss formed by the upright frame member, the tensile load carrying member and the base. During a frontal vehicle collision forward loading applied to the back frame results in a tensile load in the tensile load carrying member which reduces the bending loading in the upright frame member thus providing a significant increase in the forward load carrying capability of the back frame with only a slight increase in the back frame weight as compared to conventional seat assembly back frames not having a tensile load carrying member.

19 Claims, 3 Drawing Sheets

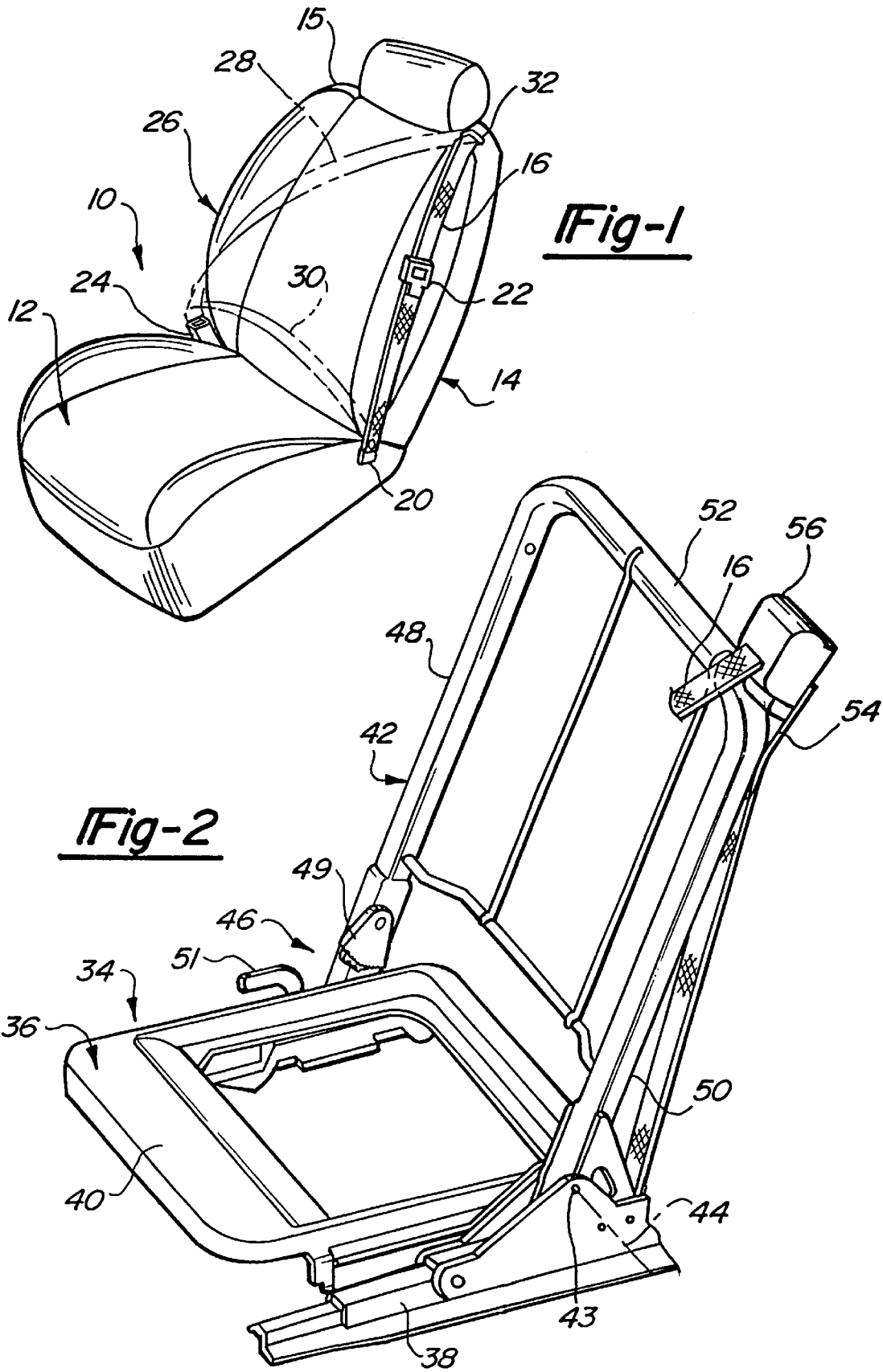

HIGH TENSION BACK FRAME FOR VEHICLE SEAT ASSEMBLY

BACKGROUND OF THE INVENTION

The present invention is a vehicle seat assembly with a high tension back frame. Such a back frame is particularly useful in a seat assembly in which a shoulder belt is coupled to the backrest of the seat assembly resulting in the back frame carrying the shoulder loads during a vehicle collision.

Motor vehicles are typically provided with an occupant restraint system comprised of belts which often includes a lap belt and a shoulder belt. These belts restrain an occupant within a vehicle seat assembly during a collision. Most often, the belt restraint system is mounted directly to the vehicle body structure adjacent to the seat assembly. The position of the seat assembly, relative to the vehicle body, is adjustable in at least the fore and aft direction and may be adjustable in other directions as well. When the belt restraint system is mounted to the vehicle body, the seat assembly moves relative to the belt restraint system. Because of the relative movement between the belt restraint system and the seat assembly, it can become inconvenient or uncomfortable for a seat occupant to use the belt restraint system in some positions of the seat assembly. For example, if the vehicle seat is moved to its forward most position, it may be difficult to reach rearward to grasp the belt mounted to the vehicle body behind the seat assembly. Furthermore, in some positions of the seat assembly, the shoulder belt may rub across the occupant's neck, creating discomfort.

Accordingly, it is becoming more common to mount the belt restraint system directly to the seat assembly so that the restraint system moves with the seat assembly during adjustment. However, with the attachment of the restraint system to the seat assembly, it is necessary to increase the load carrying capability of the seat assembly to accommodate the restraint system loads. The result of increasing the seat assembly strength is often an increase in the seat assembly weight. This weight increase is contrary to the desire of vehicle manufacturers to reduce the weight of motor vehicles and thus improve fuel efficiency.

Accordingly, it is an object of the present invention to provide a seat assembly with increased load carrying capability to accommodate the restraint system loads while minimizing the increase in the seat weight.

SUMMARY OF THE INVENTION

The object of the present invention is accomplished by providing a back frame for the seat assembly having an upright frame member capable of supporting compressive and tensile loading and a secondary, tensile load carrying member capable of only supporting significant loads in tension. The tensile load carrying member is attached to the upright frame member at the upper end of the back frame. The upright frame member and the tensile load carrying member are both attached to a base at the lower end of the back frame with the tensile load carrying member spaced rearward of the upright frame member. The result is a triangular truss formed by the upright frame member, the tensile load carrying member and the base. During a frontal vehicle collision, the shoulder belt load applied to the upper end of the back frame results in a tensile load in the tensile load carrying member and a compressive load in the upright frame member. This loading significantly reduces bending loading of the upright frame member. During a rear impact to the vehicle, the occupant loading on the seat back results in the upright frame member being loaded in bending with no appreciable loading of the tensile load carrying member.

The tensile load carrying member is preferably in the form of a flexible strap made of a high strength material such as martensite steel. Other high tensile strength materials can be used as well, such as fiber glass, plastic composites and woven fabrics, such as the webbing used in the restraint system belts. The use of a tensile load carrying member to form a truss results in significantly increased forward loading capability to the back frame with only a slight increase in the frame weight.

The back frame is rotatably mounted to a base frame at a pivot. A recliner mechanism is provided which is operatively coupled to the base of the back frame and the frame of the lower seat part to hold the back frame in an adjusted, rotational position relative to the seat lower frame.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a vehicle seat assembly having the back frame of the present invention;

FIG. 2 is a perspective view of the frame of the seat shown in FIG. 1;

DETAILED DESCRIPTION OF THE PREFERRED EMBODIMENT

Figure 3:
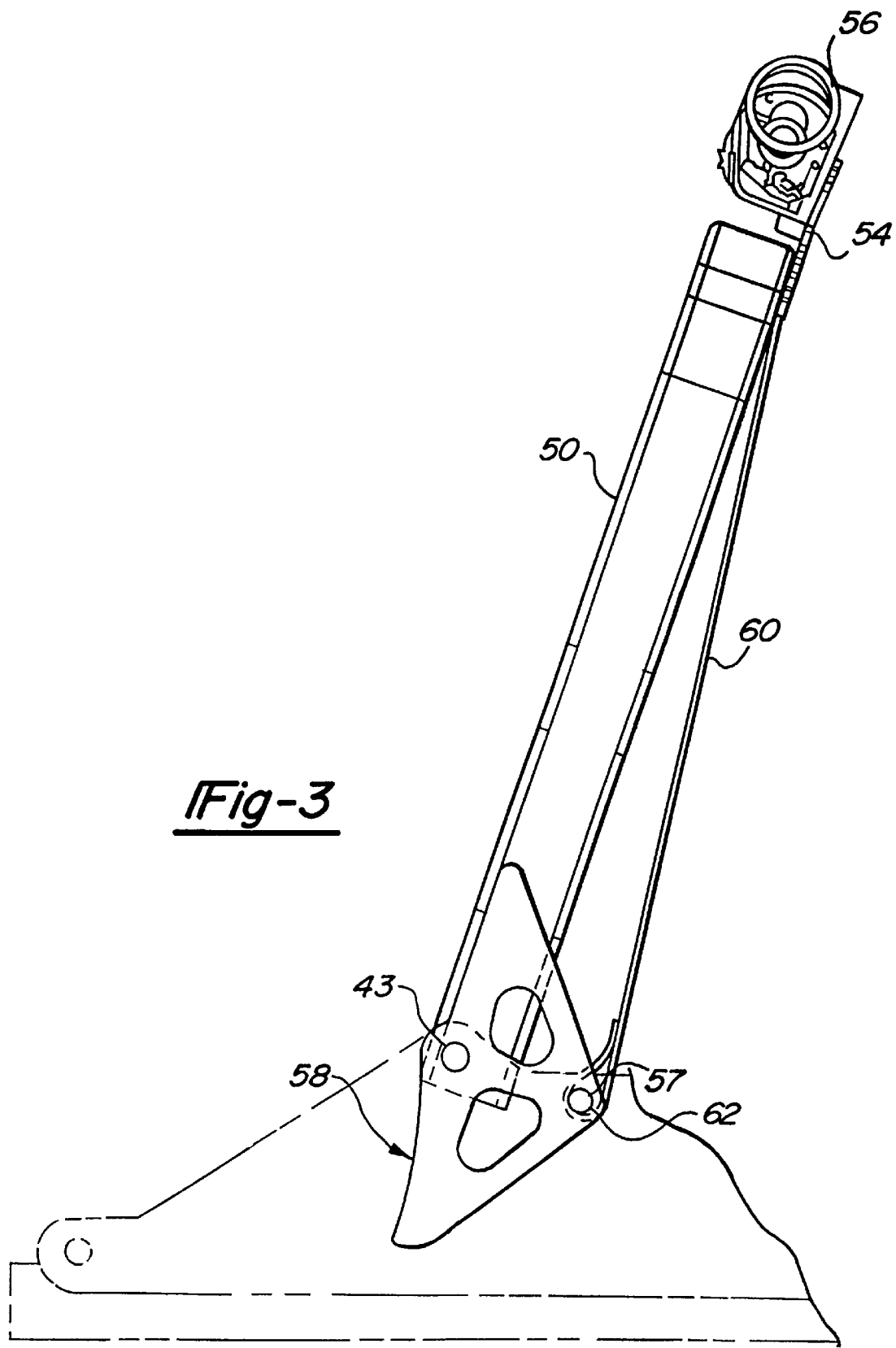
FIG. 3 is a side view of the back frame of the present invention.
Figure 4:
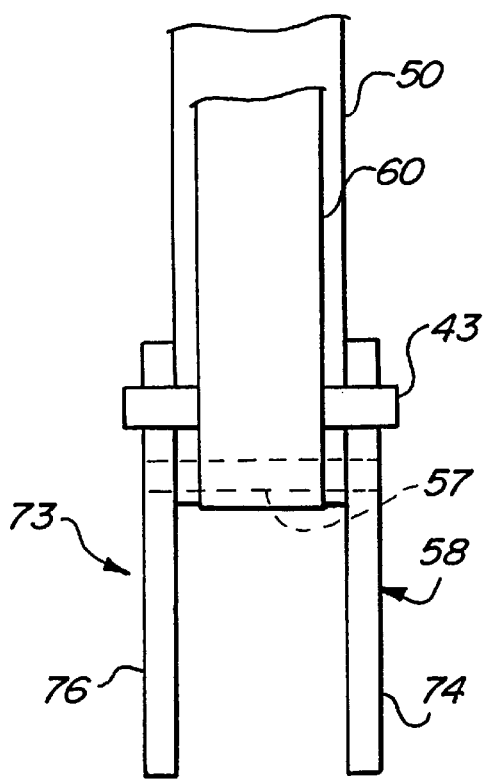
FIG. 4 is rear view showing the lower end of the back frame.

The vehicle seat assembly having the high tension back frame of the present invention is shown in FIG. 1 and is designated generally at 10. Seat assembly 10 includes a lower, generally horizontal seat part 12 and a backrest 14 extending generally upwardly at the rear of the lower seat part 12. The backrest 14 has an upper end 15. An occupant restraint system is mounted to the seat assembly 10 and includes a belt webbing 16. The belt webbing 16 extends downwardly along the outboard side of the seat assembly 10 where one end of the webbing 16 is attached to the lower seat part 12 at the rear end of the seat part 12 at the attachment 20. A tongue 22 is slidable along the webbing 16 between the attachment 20 and the upper end 15 of the backrest 14. A buckle 24 is attached to the inboard side 26 of the seat assembly 10 for reception of the tongue 22 therein. When the tongue 22 is inserted into the buckle 24, the webbing 16 forms a shoulder belt 28, which crosses diagonally over the torso of a seat occupant, and a lap belt 30, which crosses the lap of a seat occupant to restrain the occupant within the seat assembly 10. At the upper end 15 of the backrest 14, the webbing 16 passes into the backrest 14 through an opening 32. The webbing 16 is routed to a webbing retractor 56 inside the backrest 14 having a spool upon which excess webbing 16 is wound. The retractor is attached at the upper end 15 of the backrest 14 as described below.

The terminology "inboard" and "outboard" is used as a convenience to designate the sides of the seat assembly 10. As is typically the case, the shoulder belt 28 extends from the upper, outboard side of the seat assembly 10 to the lower, inboard side of the seat assembly 10. The seat assembly 10 has been shown and described in this manner. However, nothing herein should be construed to limit the present invention to such a belt configuration.

With reference to FIG. 2, the seat frame 34 is shown. Frame 34 has a base frame 36 which includes the fore and aft seat adjuster 38 and the seat pan 40 which supports the cushion of the lower seat part 12. A back frame 42 extends upwardly from the base frame 36 and provides the structural support within the backrest 14. The back frame 42 is mounted for rotation relative to the base frame 36 by a pivot 43 defining a transverse axis 44. The backrest 14 is held in position about the axis 44 by a recliner mechanism 46. The recliner mechanism 46 is a pawl and sector type recliner having a sector 49. To adjust the angular position of the backrest 14, the recliner release lever 51 is pulled upward to release the recliner mechanism 46 to enable the backrest 14 to rotate about the axis 44. Such a pawl and sector recliner mechanism 46 is well known in vehicle seating. Other recliner mechanisms, such as a rotary recliner with continuously engaged gears, a linear recliner, power recliners, etc., can be used in the seat assembly 10.

By coupling the webbing 16 to the backrest 14, during a frontal vehicle collision, substantial load is applied to the backrest 14 which must be transmitted to the base frame 36 with little or no forward deformation of the backrest 14. This is necessary to prevent excessive forward movement of the seat occupant to provide the desired occupant protection. The back frame 42 is designed to carry the shoulder belt 28 loading. The back frame 42 is of a conventional, generally inverted U-shaped structure having an inboard upright frame member 48, an outboard upright frame member 50 and a cross bar 52 at the upper ends of the two upright frame members 48, 50. The upright frame members 48, 50 are structural, load carrying frame members that can support both tensile and compressive loading. The retractor 56 is attached to the back frame 42 at the upper end thereof, adjacent to the upper end of the outboard upright frame member 50 through an attachment bracket 54. The retractor 56 can be directly mounted to the cross bar 52 or to the upright frame member 50 if desired, and eliminate the need for a separate attachment bracket 54. At the lower end of the upright frame member 50, the frame member 50 is attached to a base 58. The pivot 43 extends through both the base 58 and the upright frame member 50.

A strap 60 of a high tensile strength material is attached to the upright frame member 50 at its upper end and extends downwardly behind the upright frame member 50 and is attached at its lower end to a cross bar 57 of the base 58. The attachment of the strap 60 to the base 58 occurs generally in the area of the pivot 43 and is spaced rearward therefrom. The strap 60 supports no or very little load in compression but has a high tensile strength. As a result, the strap 60 is referred to as a tensile load carrying member. The strap 60, together with the upright frame member 50 and the base 58 form a triangular truss. Upon application of a forwardly directed load at the upper end of the upright frame member 50, such as a load applied by the shoulder belt 28 during a front vehicle collision, the tensile load carrying member 60 is loading in tension while the upright frame member 50 carries a compressive load together with a foreword bending moment caused by the shoulder belt loading. The addition of the strap 60 significantly reduces the bending moment in the upright frame member 50 and thus increases the forward loading strength of the back frame 42 compared to a frame having only the upright frame member 50 without the strap 60.

Because the strap 60 is flexible, it will not carry a compressive load. Thus, in a rear vehicle collision, the occupant load on the upright frame member 50 is a bending load. The strap 60 only increases the back frame 42 strength in a forward loading. The addition of the strap 60 results in a significant increase in the foreword load strength with only a small increase in the weight of the back frame 42. The tensile load carrying member or strap 60 is preferably made of a high strength material such as martensite steel. Other materials can be used including a woven fabric such as that used in the lap belt and shoulder belt webbing, fiber glass materials, plastic composite materials, etc.

The upright frame member 50 can be of any desired shape. It may be a round tube, a square tube, I beam, C shaped beam, or any other structural load carrying cross section, as desired.

The base 58 may be a weldment 73 consisting of a pair of plates 74 and 76 attached to opposite sides of the upright frame member 50. The weldment 73 includes the cross member 57 at the contact point 62 for attachment of the strap 60 to the base 58.

Figure 5:
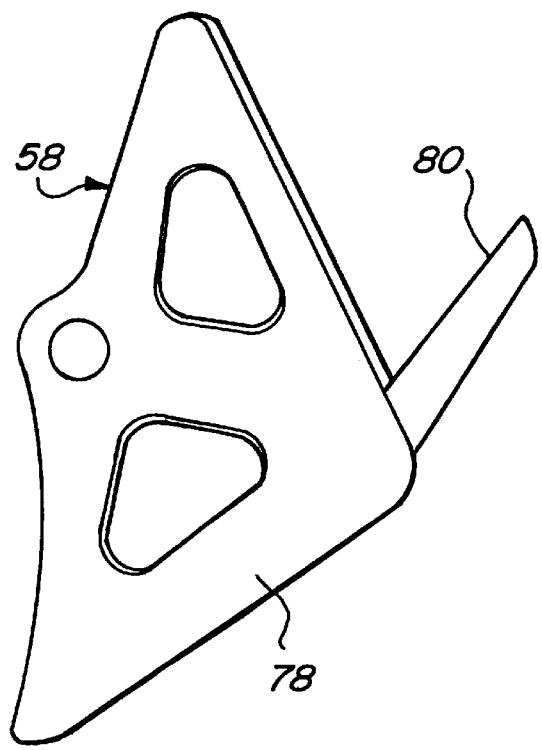
FIGS. 5 and 6 are perspective views of alternative embodiments of the back frame base.
Figure 6:
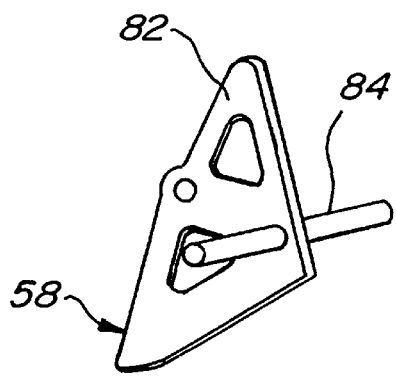

An alternative embodiment of the base 58 is shown in FIG. 5. There the base has a single plate 78 with a bar 80 extending transversely in one direction, perpendicular from the plate 78 to attach to the strap 60.

In yet another embodiment of the base 58, a single plate 82 is provided with a cross bar 84 attached to the plate 82 at the middle of the bar 84 such that the bar 84 extends perpendicular from both sides of the plate 82.

The upright frame member 50 and the base 58 may be integrally formed as a single piece. Alternatively, they may both be formed as weldments of several elements joined together by welding or other fastening devices and methods.

It is to be understood that the invention is not limited to the exact construction illustrated and described above, but that various changes and modifications may be made without departing from the spirit and scope of the invention as defined in the following claims.

We claim:

1. A frame for a vehicle seat assembly comprising:
   a generally horizontal base frame;
   a back frame extending generally upwardly from said base frame and being rotatably mounted to said base frame for rotational movement about a transverse axis, said back frame including a generally upright frame member capable of supporting compressive and tensile loading, said upright frame member having upper and lower ends;
   a base coupled to said lower end of said upright frame member and rotatably mounted to said base frame for rotation about said transverse axis; and
   a tensile load carrying member capable of supporting tensile loading, said tensile load carrying member having an upper end mechanically communicating with said upright frame member and a lower end attached to said base rearward of said transverse axis, whereby said upright frame member, said base and said tensile load carrying member form a truss which, upon the application of a forwardly directed load at said upper end of said upright frame member, loads said tensile load carrying member in tension.

2. The frame as defined in claim 1 wherein said tensile load carrying member is a flexible strap.

3. The frame as defined in claim 1 wherein said tensile load carrying member is a flexible strap of martensite steel.

4. The frame as defined in claim 1 wherein said tensile load carrying member is made of a material selected from the group of steel, fiberglass, plastic composites, and woven fabric.

5. The frame as defined in claim 1 further comprising a shoulder belt retractor mounted to said upright frame member at said upper end thereof.

6. The frame as defined in claim 1 wherein said base includes first and second plates on opposite sides of said upright frame member.

7. The frame as defined in claim 6 wherein said base further comprises a cross bar extending between said plates to which said tensile load carrying member is coupled.

8. A vehicle seat assembly comprising:

a lower generally horizontal seat part and a backrest extending generally upwardly from said seat;

a frame having a generally horizontal base frame and a back frame extending generally upwardly from said base frame to support said backrest and being rotatably mounted to said base frame at a pivot for rotation about a transverse axis, said back frame including a generally upright frame member capable of supporting compressive and tensile loading, said upright frame member having upper and lower ends, a base at said lower end of said upright frame member rotatably mounted to said base frame for rotation about said transverse axis, and a tensile load carrying member capable of supporting tensile loading, said tensile load carrying member having an upper end mechanically communicating with said upright frame member and a lower end attached to said base rearward of said transverse axis whereby said upright frame member, said base and said tensile load carrying member form a truss which, upon the application of a forwardly directed load at said upper end of said upright frame member loads said tensile load carrying member in tension; and a recliner mechanism operatively associated with said back frame and said base frame to adjustably lock said back frame in a fixed position relative to said base frame.

9. The vehicle seat assembly as defined in claim 8 wherein said tensile load carrying member is attached to said base generally rearward of said pivot.

10. The vehicle seat assembly as defined in claim 8 wherein said recliner mechanism interacts with said back frame at a location below said pivot.

11. The vehicle seat assembly as defined in claim 8 wherein said tensile load carrying member is a flexible strap.

12. The vehicle seat assembly as defined in claim 8 wherein said tensile load carrying member is a flexible strap of martensite steel.

13. The vehicle seat assembly as defined in claim 8 wherein said tensile load carrying member is made of a material selected from the group of steel, fiberglass, plastic composites, and woven fabric.

14. The vehicle seat assembly as defined in claim 8 further comprising a shoulder belt retractor mounted to said back frame at said upper end of said upright frame member.

15. The vehicle seat assembly as defined in claim 8 wherein said base includes at least one plate attached to and extending rearward of said upright frame member at said lower end thereof.

16. The vehicle seat assembly as defined in claim 15 wherein said base further comprises a cross bar to which said tensile load carrying member is coupled.

17. The vehicle seat assembly as defined in claim 8 wherein said base includes first and second plates on opposite sides of said upright frame member.

18. The vehicle seat assembly as defined in claim 17 wherein said base further comprises a cross bar extending between said plates to which said tensile load carrying member is coupled.

19. The vehicle seat assembly as defined in claim 8 wherein said recliner is on a side of said seat assembly opposite said tensile load carrying member.

* * * * *